(No Model.)

W. J. McCOLLOM.
CAMERA SHUTTER.

No. 520,696. Patented May 29, 1894.

WITNESSES:
William Goebel.
C. Sedgwick.

INVENTOR
W. J. McCollom
BY
Munn & Co.
ATTORNEYS.

THE NATIONAL LITHOGRAPHING COMPANY,
WASHINGTON, D. C.

UNITED STATES PATENT OFFICE.

WILLIAM J. McCOLLOM, OF SWALEDALE, IOWA.

CAMERA-SHUTTER.

SPECIFICATION forming part of Letters Patent No. 520,696, dated May 29, 1894.

Application filed December 28, 1893. Serial No. 494,932. (No model.)

*To all whom it may concern:*

Be it known that I, WILLIAM J. McCOLLOM, of Swaledale, in the county of Cerro Gordo and State of Iowa, have invented a new and Improved Camera-Shutter, of which the following is a full, clear, and exact description.

My invention relates to an improvement in camera shutters, and the object of my invention is to produce a very simple and inexpensive shutter which may be used in connection with any ordinary camera, which is arranged to close from around the lens tube toward the center and open in the reverse direction, thus preserving the circular shape of the lens opening and preventing the light from striking unevenly on the sensitive plate, which has few moving parts, which has these parts arranged so as to move very easily and with little friction, which has the parts counterbalanced to enable them to be operated with great facility, and which is provided with pneumatic means for opening and closing it.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1:
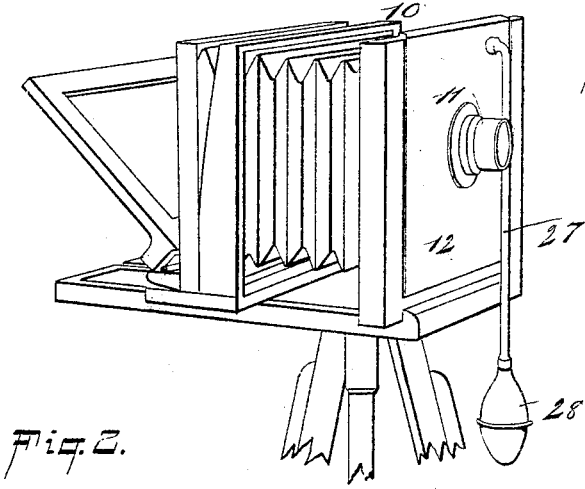
Figure 2:
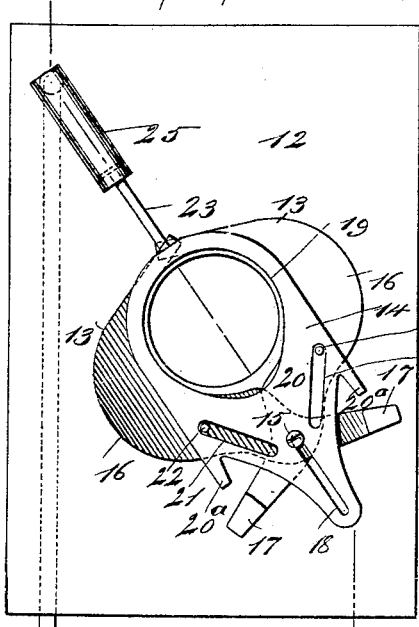
Figure 3:
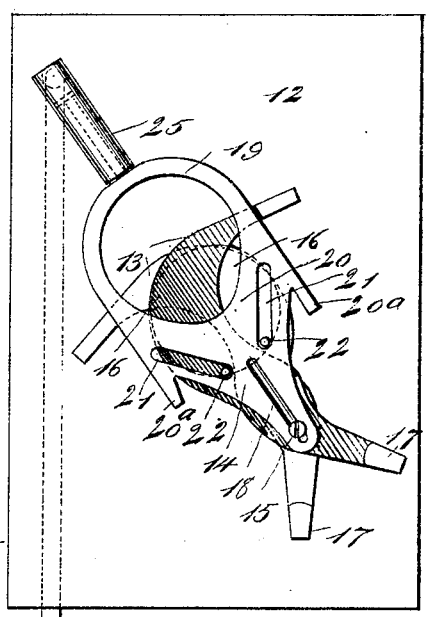
Figure 4:
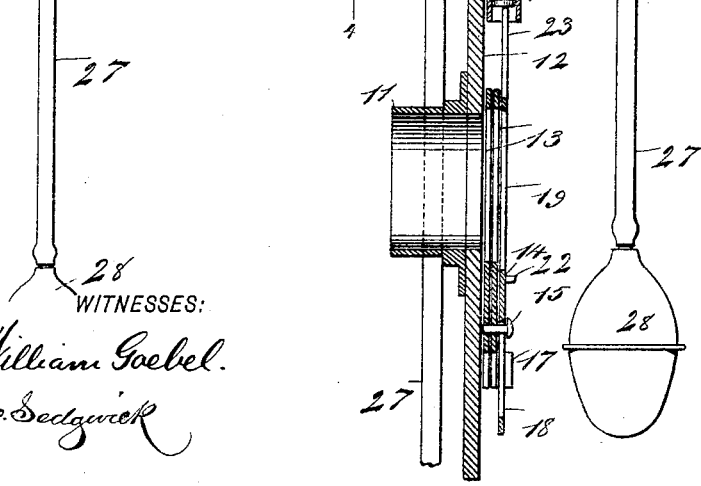

Figure 1 is a perspective view of a camera provided with my improved shutter. Fig. 2 is an enlarged inside elevation of the front plate of the shutter, showing my improved shutter thereon and in open position. Fig. 3 is a similar view with the shutter closed, and Fig. 4 is a vertical section on the line 4—4 of Fig. 2.

The camera 10 may be of any approved kind and its front plate 12 has the lens tube 11 projecting from it in the customary manner. The lens opening is closed by a shutter composed of the two swinging leaves 13, which overlap, and a sliding leaf 14, the leaves 13 being adapted to swing inwardly from different sides of the lens opening, so as to close it from the outside toward the center. The leaves 13 are oppositely arranged and swing on a common fulcrum pin or screw 15, the leaves being widest near the center, as shown at 16, and tapering toward their free ends and toward the fulcrum, so that when thrown open they will expose the whole lens opening and when closed they, together with the leaf 14, will completely cover said opening. The leaves 13 project beyond their fulcrum 15, crossing as illustrated in Figs. 2 and 3, and the arms thus produced are provided with counterbalancing weights 17 which counterbalance the other moving parts of the shutter, and which are preferably made of lead, so that they may act as dull cushions for the leaf 14, as hereinafter described, although they may be made of any suitable material. The leaves 13 swing from opposite sides of the lens opening, as described, and the leaf 14 slides straight across the lens opening, the leaf 14 being slotted longitudinally near one end, as shown at 18, so that it may slide on the fulcrum pin or screw 15. The leaf 14 has a central opening 19, rather larger than the lens opening, and the adjacent body portion 20 of the leaf is, of course, semi-circular on the side next the opening, and consequently this semi-circular portion, in connection with the semi-circular inner sides of the swinging leaves, causes the shutter as it is closed, to move inward circularly from around the opening so as to preserve the aperture circular, or nearly so until the opening is entirely covered. The leaf 14 has on opposite sides and near one end projecting arms 20ª, which are parallel and which serve as abutments to strike the counterbalances 17, so that when the shutter is thrown quickly open the counterbalances and arms receive the shock, and the shock is distributed by these parts meeting as they do and the strain taken off the pin 15, and any jar to the camera prevented.

The sliding leaf 14 is provided with diagonal and oppositely arranged slots 21, which receive pins 22 projecting from the leaves 13, and consequently when the sliding leaf 14 is moved to close or open the lens opening, the leaves 13 will be moved, swinging in the manner already described. The leaf 14 is secured at one end to a piston rod 23, which is secured to a piston 24 sliding in a cylinder 25, this being fastened to the plate 12 of the camera and having at one end a tube 26, which projects through the front plate 12 and is adapted to connect with the rubber tube 27 leading to the ordinary hand air bulb 28.

The shutter is operated by alternately squeezing and releasing the bulb 28, the pressure on the bulb forcing air into the cylinder 25 so as to expel the piston 24, and push the leaf 14 into position to move the opening 19 opposite the lens opening and at the same time, swing apart the leaves 13, and the sudden expansion of the bulb creates a suction which draws in the piston and reverses the above movements. The counterbalancing weights 17 cause the three leaves of the shutter to move very easily and they have a tendency to throw the weight on the pivot pin 15 so as to prevent excessive friction. The shutter may be moved quickly as in instantaneous photography, or any length of exposure desired may be made, as by squeezing the bulb and removing the pressure gradually the shutter leaves will stay open any length of time desired, then by squeezing the bulb and suddenly removing the pressure the shutter will be closed.

In carrying out my invention, the cylinder 25 may be arranged at any convenient point on the plate 12, so that the piston rod and leaves may point upward, downward, and laterally, without in any way affecting the working of the device.

The shutter may also be attached to a flat surface of wood similar to the front plate 12, and fastened to the front or rear ends of the lens tube.

Having thus described my invention, I claim as new and desire to secure by Letters Patent—

1. A camera shutter, comprising a suitable support having an opening; oppositely arranged curved leaves to swing over the opening, counter-balances for the leaves, and a sliding leaf adapted to move over the opening, at right angles to the general direction of movement of the leaves, and having an aperture to register with the opening, and an operative connection between the sliding and the swinging leaves, whereby they work in unison, substantially as described.

2. The combination, of the oppositely arranged swinging leaves having counterbalancing weights, the sliding leaf oppositely connected with the swinging leaves to move in unison therewith, and abutments on the sliding leaf to strike the weights, substantially as described.

3. In a camera shutter, the combination with a support having an opening, of a slide forming a partial closure of such opening, and two pivoted leaves co-acting with such slide in forming a closure of the opening, the pivoted leaves having a rocking movement toward and from the axis of the slide, and the slide having connection with said leaves and serving to actuate the same, substantially as described.

4. In a camera shutter, the combination with a support having an opening, of a slide forming a partial closure of such opening, and two pivoted leaves co-acting with such slide in forming a closure of the opening, the pivoted leaves having a rocking movement toward and from the axis of the slide and having weighted counterbalanced arms beyond their pivots, and the slide having engagement with the leaves and serving to actuate the same, substantially as described.

5. In a camera shutter, the combination with a support having an opening, of two leaves pivoted to a stud at one side of the opening to rock toward and from each other, the leaves overlapping at the center of the opening, of a slide having guided movement in a straight direction, on said stud, and having straight diverging slots above its point of engagement with the stud, and pins on the leaves projecting into such diverging slots, the slide forming a partial closure of the opening, substantially as described.

6. In a camera shutter, the combination, with a support having an opening, of two pivoted leaves having a rocking movement toward and from each other, the leaves having curved inner edges and overlapping at one end, the opposite ends beyond the pivots being weighted to counterbalance the portions at the opening, substantially as described.

7. The combination, with a support having an opening, of the oppositely arranged swinging leaves and the sliding leaf oppositely connected with the swinging leaves to move in unison therewith, the three closing over the opening from three sides toward a common center, substantially as described.

WILLIAM J. McCOLLOM.

Witnesses:
D. H. VANKIRK,
B. CARR.